United States Patent [19]

Van Meter

[11] 4,154,465
[45] May 15, 1979

[54] FITTING FOR SMOOTH WALL TUBES

[75] Inventor: Homer Van Meter, St. Petersburg, Fla.

[73] Assignee: Ramer Test Tools, Inc., Stevensville, Mich.

[21] Appl. No.: 901,609

[22] Filed: May 1, 1978

Related U.S. Application Data

[63] Continuation-in-part of Ser. No. 816,157, Jul. 15, 1977, abandoned.

[51] Int. Cl.² ............................................. F16L 37/18
[52] U.S. Cl. ............................ 285/312; 285/323; 285/338
[58] Field of Search ............... 285/312, 346, 338, 104, 285/105, 323, 8, 196, 311, 322, DIG. 25

[56] References Cited

U.S. PATENT DOCUMENTS

| | | | |
|---|---|---|---|
| 1,784,821 | 12/1930 | Crowley | 285/312 X |
| 3,097,866 | 7/1963 | Iversen | 285/322 X |
| 3,542,076 | 11/1970 | Richardson | 285/338 X |
| 3,655,225 | 4/1972 | Major | 285/338 X |
| 3,709,260 | 1/1973 | Windle | 285/338 X |
| 3,779,587 | 12/1973 | Racine | 285/312 |
| 3,868,132 | 2/1975 | Racine | 285/312 |

Primary Examiner—Thomas F. Callaghan
Attorney, Agent, or Firm—Knechtel, Valentino, Demeur & Dallas

[57] ABSTRACT

This invention relates to a fitting for mounting to the ends of smooth wall tubes. The fitting grips on the outside diameter of the tube, and also seals on its inside diameter, with positive adjustable handle torque action. The counter forces of ID sealing and OD gripping at the same point eliminate the possibility of tube distortion especially on minimum wall tubing even at elevated pressures.

19 Claims, 5 Drawing Figures

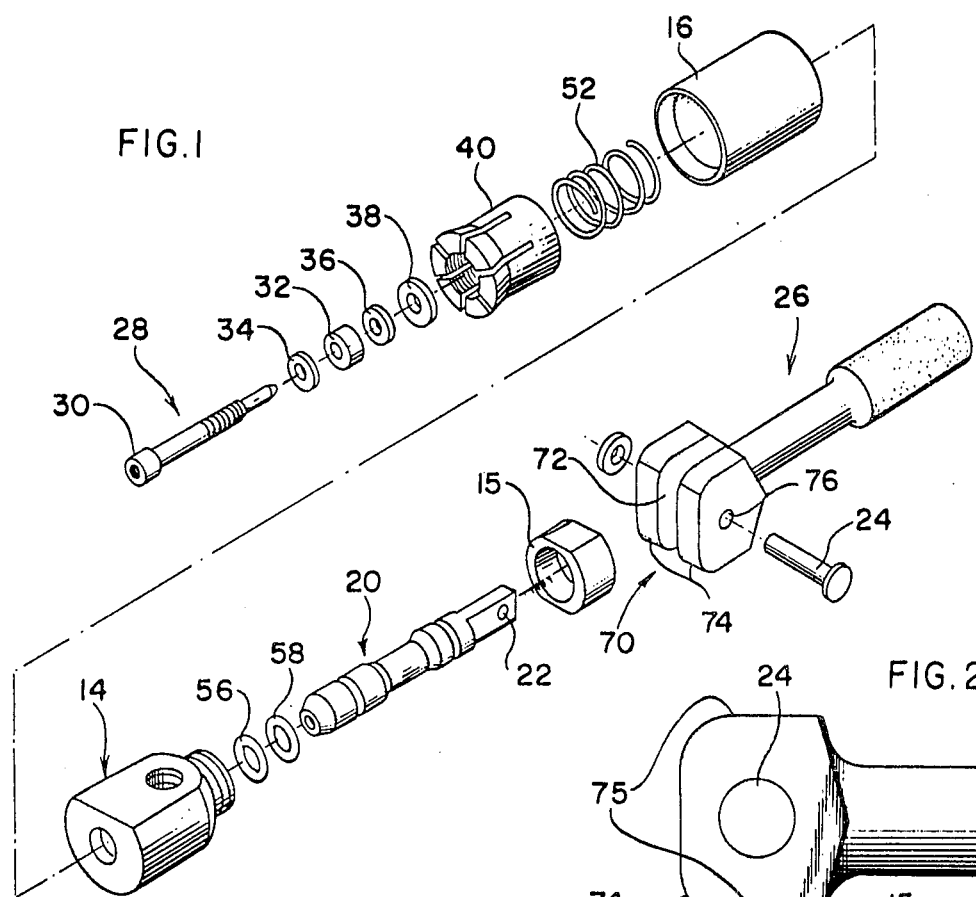
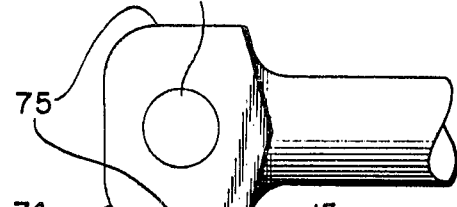
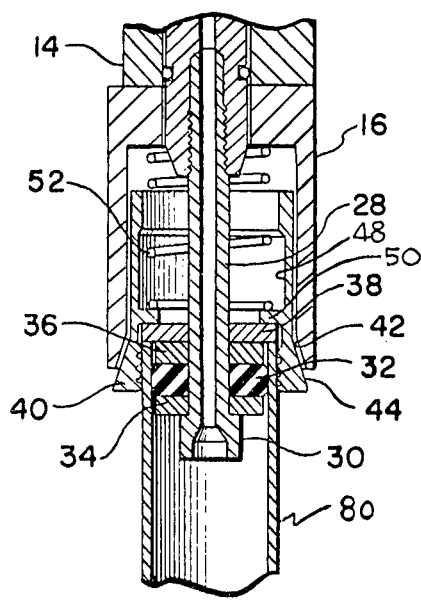
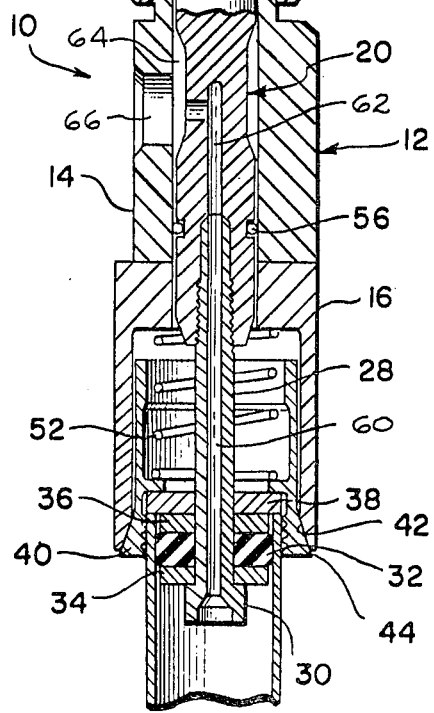

FIG.4
FIG.5
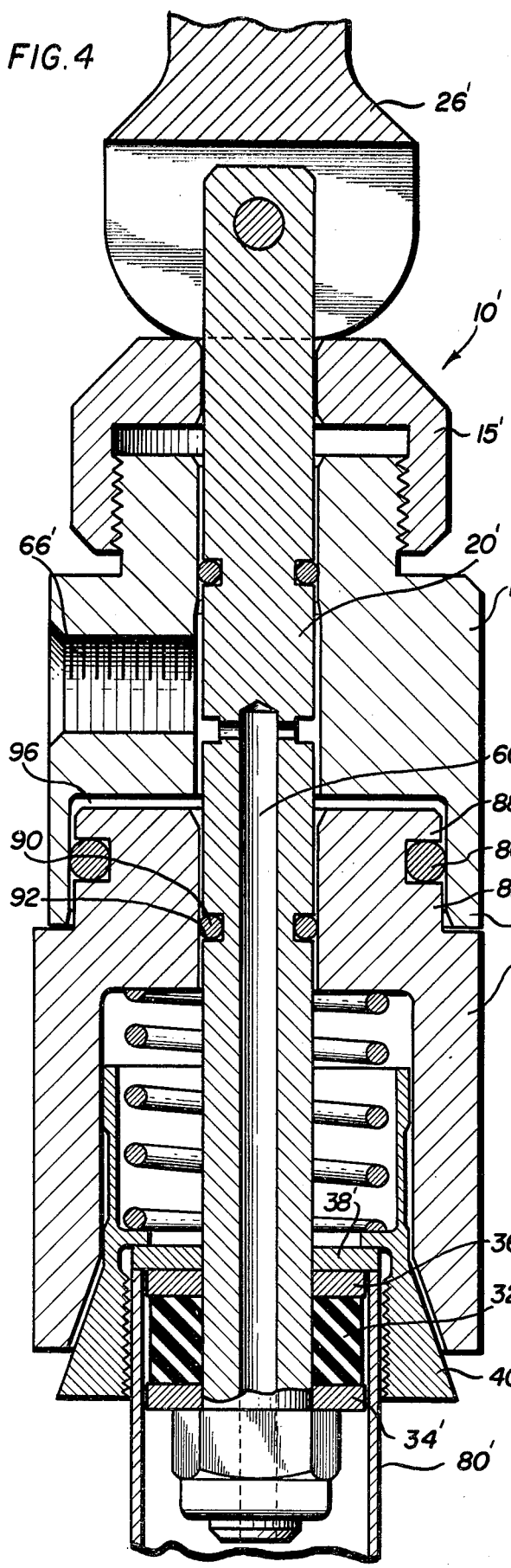
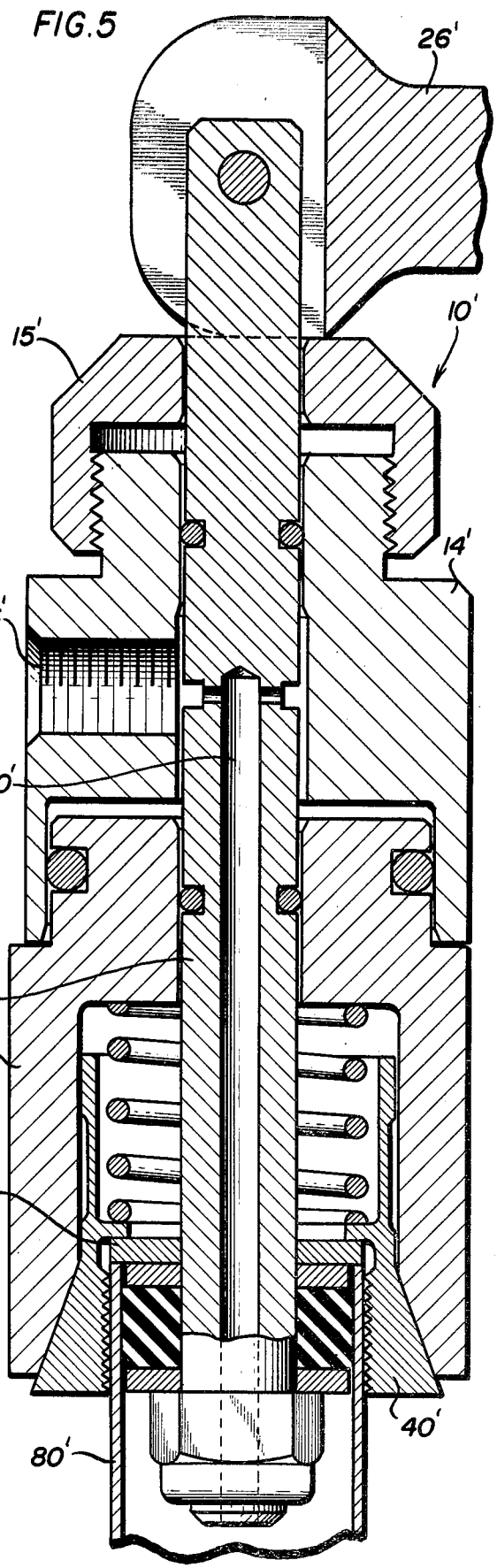

FITTING FOR SMOOTH WALL TUBES

This application is a continuation-in-part of copending application, Ser. No. 816,157, filed July 15, 1977 and now abandoned.

BACKGROUND AND BRIEF DESCRIPTION OF THE PRESENT INVENTION

This invention relates to a fitting for mounting to the ends of smooth wall tubes.

The fitting of the present invention is generally related to those types of fittings disclosed in U.S. Pat. Nos. 3,738,688; 3,779,587; and 3,868,132.

The fittings disclosed in the above-mentioned U.S. patents are mounted to the end of a smooth wall tube by, generally, compressing a tubular plug against the outer diameter of the tube upon translation of a ram element within the housing thereof. Such fittings provide a good seal and holding action so that fluids passing through the smooth wall tube may be sealed by the fitting, or may be conveyed out of the fitting into auxiliary tubing mounted thereto.

While these fittings function exceptionally well in most cases, the fitting of the present invention is particularly designed for application on short protrusion or expanded refrigeration and air conditioning tube ends existing on all industrial components, such as, for example, condensers, evaporators, compressors, header assemblies and the like. In many cases, the tubing is thin-walled, and fittings of the type disclosed in the above-identified U.S. patents can distort the tube ends when fitted thereto.

Accordingly, the present invention provides such a fitting that not only grips on the outside diameter, but also seals on the inside diameter. The counter forces of ID sealing and OD gripping at the same point eliminate the possibility of tube distortion especially on minimum wall tubing even at elevated pressures.

In the application of the fitting, only a short protrusion is required, generally only about 0.200", for tubes up to 0.625" OD. The fitting is applicable for use on a wide range of tube sizes, for example, from 0.250"ID and 1.00"OD. Due to the limited tube length required, maximum area of tube may be tested, and testing may be done above the support plate on a condenser or evaporator core. The fitting's configuration, furthermore, is designed for confinement clearance side-by-side use on condensor and evaporator cores, as well as compressor body clearance. Simple maintenance of the fitting is all that is required.

Accordingly, it is an object of the present invention to provide improved fittings for mounting to the ends of smooth wall tubes. More particularly, it is an object to provide such a fitting which is designed for application on short protrusions or expanded tube ends, and which seals on the inside diameter (ID) and grips on the outside diameter (OD), at the same point, thus eliminating tube distortion.

BRIEF DESCRIPTION OF THE DRAWINGS

For a fuller understanding of the nature and objects of the invention, reference should be had to the following detailed description taken in connection with the accompanying drawings, in which:

FIG. 1 is an exploded perspective view of a fitting exemplary of a first embodiment of the invention;

FIG. 2 is a sectional view taken longitudinally through the fitting of FIG. 1;

FIG. 3 is a partial sectional view of the fitting of FIG. 1;

FIG. 4 is a sectional view taken longitudinally through a similar fitting exemplary of another embodiment of the invention, with the fitting in its inoperative position; and FIG. 5 is a sectional view of the fitting of FIG. 4 in its operated position.

DESCRIPTION OF A PREFERRED EMBODIMENT

Referring now to the drawings, in FIGS. 1–3, a tube fitting 10 is illustrated which comprises a generally elongated housing 12 including a body 14 to which is threadedly affixed at its upper end an adjusting nut 15. At the other or lower end of the body 14 is a collet operator 16 which is secured thereto, as more fully described below. A shaft 20 extends longitudinally through the adjusting nut 15 and the body 14, and partly through and into the collet operator 16. The upper end of the shaft 20 is flattened and has an aperture 22 provided in it, for receiving a fastening pin or rivet 24, for securing the shaft 20 to a handle 26.

An elongated seal screw 28 having an enlarged head 30 has a resilient sealing member 32 disposed about it, and the sealing member 32 is sandwiched between a pair of seal stops 34 and 36 which are likewise disposed on the seal screw, with one of the seal stops engageable with the enlarged head 30. A tube stop 38 also is disposed about the seal screw 28, atop the seal stop 36. It may be noted that the seal stops 34 and 36, and the tube stop 38 all are of a washer-type construction, with the diameter of the tube stop 38 being slightly larger than the diameter of the seal stops 36 and 34. The resilient sealing member 32 may be made of rubber or other like material, and is generally of a cylindrical configuration. The end of the seal screw 28 opposite the enlarged head 30 is threadedly secured to the shaft 20 by, for example, threadedly engaging its end within a threaded cavity 21 in the end of the shaft 20.

A split collet 40 is slidably engaged within the opened lower end of the collet operator 16. The collet operator 16 and the collet 40 have complimentary conical-shaped cam surfaces 42 and 44 on them, respectively, for operating the collet 40 to grip a tube end, as more fully described below. The collet 40 also has an annular flange formed on its interior wall 48 which forms an annular shoulder or stop 50.

A helical spring 52 is disposed about the seal screw 28 and is disposed within the collet 40 and the collet operator 16. One end of the spring 52 bears against the upper interior cavity wall of the collet operator 16 and its other end bears against the annular stop 50 on the collet 40. The spring 52 normally urges the collet 40 out of the collet operator 16, but the collet 40 is restrained therein by the annular stop 50 which engages against the tube stop 38. Correspondingly, the collet operator 16 is retained about the collet 40 in operative relationship with the body 14 to form the housing 12, by the cam surfaces 42 and 44 on the collet operator 16 and the collet 40, respectively.

"O" ring seals 56 and 58 are disposed within seal seats 57 and 59, respectively, formed in the side wall of the shaft 20, and provide seals between the shaft 20 and the body 14.

A fluid channel 60 is provided through the seal screw 28, and this fluid channel 60 is in communication with a fluid channel 62 in the shaft 20. The fluid channel 62 further is in communication with another fluid channel 64, which is, in turn, in communication with an outlet port 66 in the body 14. The outlet port 66 permits fluids to be conveyed into the fitting 10 via auxiliary tubing mounted thereto. If desired, the fluid channels 62 and 64 can be eliminated, so that the fitting 10 merely functions as a stop.

The handle 26 has an enlarged head portion 70 which has a slot 72 formed in it for receiving therein the flattened portion of the shaft 20 and aligned apertures, such as the aperture 76, for receiving therethrough the pin or rivet 24 for securing together the handle 26 and the shaft 20. The outer peripheral edge or edges 74 of the head portion 70 are engageable with the upper surface or end 77 of the adjusting nut 15 and form cam surfaces for operating the fitting 10, as more fully described below.

In using the fitting 10, the end of a smooth wall tube 80 is fitted about the end of the seal screw 28, with the seal stops 34 and 36 and the seal 32 disposed with the tube 80. The end of the tube 80 is urged onto or about the end of the seal screw 28, until the end of the tube 80 engages and is stopped by the tube stop 38. It may be noted that only a short protrusion is required, normally only about 0.200" for tubes up to 0.625" outer diameter.

The handle 26 initially is disposed to extend upwardly in longitudinal alignment with the longitudinal axis of the fitting 10. The fitting 10 is affixed to a tube by operating the handle 26 by pivotally rotating it 90 degrees, in either a clockwise or counter-clockwise fashion to a position as illustrated in FIG. 2, to engage its cam surfaces 74 with upper surface or end 77 of the adjusting nut 15. This camming action pulls the shaft 20 upwardly, as illustrated in FIG. 2, and simultaneously pushes the collet operator 16 downwardly. The seal screw 28 being threadedly affixed to the shaft 20 likewise is pulled upwardly. The enlarged head 30 on the seal screw 28 engages the seal stop 32 and, as the seal screw 28 is pulled upwardly, the tube stop 38 engages the annular stop 50 on the collet 40. The collet 40, by the combined action of the body 14 pushing the collet operator 16 downwardly and the tube stop 38 engaging the annular stop 50 on the collet 40 and urging it upwardly, forcibly react on the collet operator 16 and the collet 40 to cammingly engage the cam surface 44 on the collet 16 with the cam surface 42 on the collet operator 16. As a result, the collet 40 grips the outer diameter of the tube 80. Simultaneously, the resilient seal 32 is compressed between the seal stops 34 and 36, and seals the inside diameter of the tube 80. The counter forces of the inside diameter sealing and the outer diameter gripping at the same point eliminate the possibility of the tube distortion, particularly when the fitting 10 is used on minimum wall tubing.

The flats 75 on the enlarged head portion 70 of the handle 26 provide a stop, so that when the handle 26 is operated to those stop positions, it need not be held. The degree of sealing and gripping can be controlled by adjustment of the adjusting nut 15.

The handle 26 is operated in a counter-clockwise direction to its initial position to release the fitting 10. In doing so, the shaft 20 and the seal screw 28 are pushed downwardly, to disengage the seal 32. The spring 52 bears upon the annular stop 50 in the collet 40, and urges it out of the collet operator 16, to thereby release the grip on the outside diameter of the tube.

In FIGS. 4 and 5, there is illustrated a very similar fitting 10', the difference between the fittings 10 and 10' being that the latter is adapted to permit a fluid pressure to provide or assist in providing a more positive or secure engagement of the fitting to a tube, such as the tube 80. For example, in various applications, it is found that the use of or the encountering of an exceedingly high pressure may result in the disconnection of the fitting of the tube 80. The fitting 10' takes advantage of thse high fluid pressures to provide a more positive or secure engagement of the fitting 10 to the tube.

The fitting 10' also has an integral shaft 20' which carries the resilient seal 32' and the seal stops 34' and 36' on its one end. It can therefore be seen that the seal screw 28 of the fitting 10 is eliminated, the operation remains the same, and the only real distinction between these arrangements is that the seal screw 28 permits the fitting to be used on smaller diameter tubes. The integral shaft 20' is better suited for use with large diameter tubes.

More particularly, in the case of the fitting 10', the collet operator 16' is formed with a reduced diameter portion 82 at its upper end, and the body 14' is provided with an annular depending skirt 84 which extends about the reduced diameter portion 82 of the collet operator 16'. An O-ring seal 86 is disposed within a ring seal seat 88 formed in the reduced diameter portion 82, and provides a seal between the reduced diameter portion 82 and the skirt 84.

Another O-ring seal 90 is disposed within a ring seal seat 92 formed in the shaft 20', and provides a seal between the shaft 20' and the collet operator 16'.

The fitting 10' operates in essentially the same fashion as the fitting 10. In addition, however, when a fluid pressure is externally applied to the fitting 10', via the outlet port 66', the fluid pressure not only flows into and through the fluid channel 60' in the shaft 20', but it also flows about the shaft 20', between the body 14' and the collet operator 16', into a fluid chamber 96 between the body 14' and the top of the collet operator 16'. This fluid pressure, therefore, is exerted on the top of the collet operator 16' forcing it downwardly in engagement with the split collet 40', thereby forcing the latter to more securely grip or clamp to the tube 80'. In many applications, a fitting 10' is coupled to both terminal ends of the tubing 80', with an external source of fluid pressure coupled to the outlet port 66' of one of the fittings 10' and with a plug coupled to and sealing the outlet port 66' of the other one of the fittings 10'. In this case, the fluid pressure flowing through the tubing 80' flows through the shaft 20' of the fitting 10' sealing the one end of the tubing 80°, and likewise flows and exerts a pressure on top of the collet operator 16'. Accordingly, it can be seen that the fluid pressures encountered in using the fitting 10' are utilized to create a more secure engagement of the fitting 10' with the tube.

This construction of the fitting 10' also provides a safety feature, in that the fitting 10' will not automatically be disengaged with a tube 80' should the handle 26' accidentally be operated to its inoperative position during the course of testing a tube. With the fitting 10', should this happen, the shaft 20' is retracted as before described, but in this case, the collet operator 16' is forcibly urged into engagement with the collet 40' so that the latter still will grip the tube 80'. What effectively happens is that the body 14' and the collet operator 16' separate enlarging the size of the air chamber 96, but the fluid pressure still is exerted on the top of the collet operator 16' forcing it to cam the collet 40' to grip the tube 80'. Accordingly, the fitting will grip the tube 80 in generally the same fashion as it does when the handle 26' is first operated, until the fluid pressure is released.

It will thus be seen that the objects set forth above, among those made apparent from the preceding description, are efficiently attained and certain changes may be made in carrying out the above construction. Accordingly, it is intended that all matter contained in the above description or shown in the accompanying drawings, shall be interpreted as illustrative and not in a limiting sense.

Now that the invention has been described, what is claimed as new and desired to be secured by Letters Patent is:

1. A fitting for mounting to the ends of smooth wall tubes, said fitting being adapted to seal the inside diameter of the tube and to grip the outside diameter of the tube in the same point so that the counter forces are such as to eliminate tube distortion, said fitting comprising a body having a passageway extending longitudinally through it and an opening for receiving external means which provide a fluid flow to said fitting; a collet operator at one end of said body having an aperture in it in axial alignment with said passageway in said body; a fluid chamber between said body and the top of said collet operator; a shaft slidably disposed within and extending through said passageway in said body and said aperture in said collet operator, said shaft having an axial bore in it in communication with said opening in said body and said fluid chamber; a handle at the other end of said body having a cam surface thereon coupled to said shaft and operable to slidably reciprocate said shaft when said handle is pivotally operated to engage said cam surface with the said other end of said body; a split collet slidably disposed within said collet operator having stop shoulder means on the interior wall thereof, said split collet and said collet operator having complimentary cam surfaces which are operatively engaged to operate said split collet to grip the outside diameter of a tube when said split collet is forcibly urged into said collet operator; the end of said shaft opposite the end thereof having said handle coupled to it having sealing means and a tube stop retained thereon, said tube stop engaging said stop shoulder means, said split collet and said collet operator being forcibly urged together to engage said complimentary cam surfaces to thereby cause said split collet to grip the outside diameter of a tube and said sealing means being compressed into sealing engagement with the inside diameter of the tube when said handle is operated to slidably reciprocate said shaft, said sealing means and said split collet being disposed with respect to one another that the sealing and the gripping of the tube are substantially at the same point; fluid flow from an external source coupled to said opening in said body and from said fitting flowing into said fluid chamber and exerting a fluid pressure on said collet operator to forcibly urge said collet operator in engagement with said split collet to thereby provide a more secure grip on the outside diameter of a tube.

2. The fitting of claim 1, wherein said collet operator has a reduced diameter portion at the upper end thereof and said body has an annular depending skirt portion, said reduced diameter portion being disposed within said skirt portion, and sealing means disposed between said reduced diameter portion and said skirt portion, whereby fluid flow from an external source coupled to said opening in said body and from said fitting flows into said fluid chamber and exerts a fluid pressure on said collet operator to forcibly urge said collet operator in engagement with said split collet to thereby provide a more secure grip on the outside diameter of a tube.

3. The fitting of claim 1, wherein fluid pressure is exerted upon said collet operator to forcibly urge said collet operator in engagement with said split collet to cause the latter to grip said tube once fluid pressure is coupled from an external source to said fitting regardless of the operative position of said handle, whereby a safety factor is provided preventing the accidental disengagement of said fitting from a tube should the handle be accidentally or inadvertently operated to its inoperative position when the fitting is affixed to a tube and under test.

4. The fitting of claim 1, further comprising adjusting means coupled with said body and disposed between said body and said cam surface on said handle, said adjusting means permitting the sealing and gripping forces exerted on a tube to be adjusted by controlling the sliding reciprocating motion of said shaft.

5. The fitting of claim 2, wherein said adjusting means comprises a nut threadedly affixed to said body.

6. The fitting of claim 1, wherein said sealing means comprises a substantially cylindrical-shaped resilient member disposed about said shaft, said resilient member being sandwiched between a pair of washer-like seal stops disposed about said shaft, said pair of seal stops compressing said resilient member into sealing engagement with the inside of a tube when said handle is operated.

7. The fitting of claim 5, further comprising seals between said body and said shaft, and between said collet operator and said shaft.

8. The fitting of claim 1, wherein said tube stop comprises a washer-like tube stop disposed about said shaft, said washer-like tube stop being engageable by the terminal end of a tube to limit its insertion within said fitting.

9. A fitting for mounting to the ends of smooth wall tubes, said fitting being adapted to seal the inside diameter of the tube and to grip the outside diameter of the tube in the same point so that the counter forces are such as to eliminate tube distortion, said fitting comprising a body having a passageway extending longitudinally through it; a collet operator at one end of said body having an aperture in it in axial alignment with said passageway in said body; a shaft slidably disposed within and extending through said passageway in said body and said aperture in said collet operator; a handle at the other end of said body having a cam surface thereon coupled to said shaft and operable to slidably reciprocate said shaft when said handle is pivotally operated to engage said cam surface with the said other end of said body; a split collet slidably disposed within said collet operator having stop shoulder means on the interior wall thereof, said split collet and said collet operator having complimentary cam surfaces which are operatively engaged to operate said split collet to grip the outside diameter of a tube when said split collet is forcibly urged into said collet operator; the end of said shaft opposite the end thereof having said handle coupled to it having sealing means and a tube stop retained thereon, said tube stop engaging said stop shoulder means, said split collet and said collet operator being forcibly urged together to engage said complimentary cam surfaces to thereby cause said split collet to grip the outside diameter of a tube and said sealing means being compressed into sealing engagement with the inside diameter of the tube when said handle is operated to slidably reciprocate said shaft, said sealing means and said split collet being disposed with respect to one another that the sealing and the gripping of the tube are substantially at the same point.

10. The fitting of claim 9, wherein said end of the shaft having the sealing means thereon being a seal screw extending through said collet and having one end thereof coupled to the remaining portion of said shaft so as to be reciprocated therewith; said sealing means and said tube stop being retained on said seal screw.

11. The fitting of claim 9, further comprising adjusting means coupled within said body and disposed between said body and said cam surface on said handle, said adjusting means permitting the sealing and gripping forces exerted on a tube to be adjusted by controlling the sliding reciprocating motion of said shaft.

12. The fitting of claim 11, wherein said adjusting means comprises a nut threadedly affixed to said body.

13. The fitting of claim 9, wherein said sealing means comprises a substantially cylindrical-shaped resilient member disposed about said shaft, said resilient member being sandwiched between a pair of washer-like seal stops disposed about said shaft, said pair of seal stops compressing said resilient member into sealing engagement with the inside of a tube when said handle is operated.

14. The fitting of claim 9, further comprising an opening in said body for receiving external means to permit fluid flow from said fitting, a passageway in said shaft in communication with said opening in said body, whereby fluid from the tube can flow through said shaft to said opening.

15. The fitting of claim 14, further comprising seals between said body and said shaft.

16. The fitting of claim 9, wherein said tube stop comprises a washer-like tube stop disposed about said shaft, said washer-like tube stop being engageable by the terminal end of a tube to limit its insertion within said fitting.

17. The fitting of claim 9, wherein said complimentary cam surfaces comprise a tapered cam surface on the periphery of the exterior wall of said split collet at the terminal end thereof and a tapered cam surface on the periphery of the interior wall of said collet operator at the terminal end thereof.

18. The fitting of claim 9, further comprising biasing means disposed within said collet and said collet operator normally urging said collet out of said collet operator.

19. The fitting of claim 18, wherein said biasing means comprises a helical spring disposed within said collet and said collet operator.

* * * * *